United States Patent [19]

Pillet

[11] Patent Number: 5,754,608
[45] Date of Patent: May 19, 1998

[54] CONTROL CLUSTER FOR A NUCLEAR REACTOR

[75] Inventor: Luc Pillet, Lyons, France

[73] Assignee: Compagnie Generale des Matiéres Nucléaires, Belizy-Villacoublay, France

[21] Appl. No.: 314,491

[22] Filed: Sep. 28, 1994

[30] Foreign Application Priority Data

Sep. 29, 1993 [FR] France ............... 93 11588

[51] Int. Cl.$^6$ ............................................. G21C 7/24
[52] U.S. Cl. ........................ 376/224; 376/237; 376/333
[58] Field of Search ........................... 376/224, 327, 376/333, 236, 237

[56] References Cited

U.S. PATENT DOCUMENTS

| | | | |
|---|---|---|---|
| 3,074,871 | 1/1963 | Lustman et al. | 204/193.2 |
| 3,267,002 | 8/1966 | Fromm, Sr. et al. | 176/22 |
| 4,169,760 | 10/1979 | Bevilacqua | 376/333 |
| 4,172,762 | 10/1979 | Anthony et al. | 376/333 |
| 4,240,874 | 12/1980 | Millot | 376/237 |
| 4,470,949 | 9/1984 | Deroubaix et al. | 376/237 |
| 4,624,827 | 11/1986 | Doshi et al. | 376/333 |
| 4,642,216 | 2/1987 | Orr et al. | 376/327 |
| 4,678,628 | 7/1987 | Freeman | 376/333 |
| 4,696,793 | 9/1987 | Paul et al. | 376/327 |
| 4,699,756 | 10/1987 | Nguyen | 376/333 |
| 4,836,977 | 6/1989 | Cooney et al. | 376/333 |
| 5,064,607 | 11/1991 | Miller et al. | 376/333 |

FOREIGN PATENT DOCUMENTS

| | | |
|---|---|---|
| 674458 | 4/1966 | Belgium . |
| 0212920 | 8/1986 | European Pat. Off. . |
| 0212920 | 3/1987 | European Pat. Off. . |
| 0236114 | 3/1987 | European Pat. Off. . |
| 0236114 | 9/1987 | European Pat. Off. . |
| 0408172 | 4/1990 | European Pat. Off. . |
| 0408172 | 1/1991 | European Pat. Off. . |
| 3081296 | 4/1988 | Japan ............... 376/327 |
| 2042389 | 2/1990 | Japan . |
| 3261894 | 2/1992 | Japan . |

OTHER PUBLICATIONS

Patent Abstracts of Japan vol. 16, No. 68 (P-1314) Feb. 19, 1992 & JP-A-03,261,894 (Mitsubishi Atomic Power Ind) Nov. 21, '91 –Abstract–.

Patent Abstracts of Japan vol. 14, No. 201(P-1041) (Apr. 24, '90 & JP-A-02,042,389 (Hokkaido Electric Power Co.) Feb.13,490 –Abstract–.

*Primary Examiner*—Harvey E. Behrend
*Attorney, Agent, or Firm*—Pollock, Vande Sande & Priddy

[57] ABSTRACT

The control cluster is usable for power regulation and for load following. It comprises a spider from which are suspended rods containing a column of neutron-absorbing material. The neutron-absorbing material in at least some rods is stainless steel in lower part of the rod and, in an upper part of the rod having a length equal to 20 and 40% of the height of the column of absorbing material, another material exhibiting an interference neutron absorption which is much higher than that of stainless steel, for instance Ag-In-Cd.

6 Claims, 1 Drawing Sheet

CONTROL CLUSTER FOR A NUCLEAR REACTOR

BACKGROUND OF THE INVENTION

The present invention relates to control clusters for nuclear reactors which are moderated and cooled by pressurized water; such clusters are movable vertically by a mechanism which allows them to be inserted more or less into the core to adjust the neutron flux, and therefore to control the reactor power and optionally to shut down the reactor and to keep it at shutdown.

The invention can be employed especially in reactors which are moderated and cooled by pressurized water, in which the core consists of fuel assemblies which have a bundle of fuel rods held at the nodal points of a regular array by a skeleton formed by end-pieces connected by guide tubes. In this case the clusters consist of a spider movable by a driving mechanism and carrying rods of absorbing material which are intended to be inserted more or less into the guide tubes or even to be completely withdrawn from the core.

The power regulation and the shutdown of the reactor usually make use of a number of cluster groups of different constitutions (such as "black" clusters and "grey" clusters), especially when the reactor is designed for operation in a "load follow" mode, which requires frequent movements, of moderate amplitude, of the control clusters. Control modes of this type are described, for example, in documents EP-A-0 051 542 and FR-A-2 639 141 to which reference may be made.

The "black" clusters, whose negative reactivity is, for example, approximately 150 pcm, comprise a highly absorbing material, which may be especially a silver-indium-cadmium (Ag-In-Cd) alloy, such as one of those described in document FR-A-1 214 215. These "black" clusters can be divided into two groups, one of which is used for progressively compensating the burn-up of the core and/or for functions other than short-term regulation.

The "grey" clusters, whose negative reactivity is, for example, half of that of the "black" clusters, are employed especially for power regulation. They are often divided into a first group, inserted first into the core during a power reduction, and a second group which is introduced into the core only when it is intended to reduce the reactor power to a level approximately between 50% and 80% of the nominal power. The clusters of this second group are inserted completely into the core only to shut the reactor down and to maintain its shutdown.

Each "grey" cluster often consists of rods containing a highly absorbing material, such as an Ag-In-Cd alloy, and of rods containing a material which has a lower absorption, such as a stainless steel. However, in all cases the absorbing material in rods of conventional clusters is the same over the whole length of a given rod.

For reasons of neutron economy and of optimum management of the nuclear fuel it is desirable to have a negative reactivity of the clusters as low as possible. However, this runs counter to safety, which requires a large negative reactivity to be inserted into the core during an emergency shutdown in order that a margin of negative reactivity should remain in the core when it must be maintained at shutdown, this being under all possible temperature conditions.

SUMMARY OF THE INVENTION

An object of the invention is to provide a control cluster for a nuclear reactor, which can be employed especially for power regulation and for load following, enabling these contradictory demands to be reconciled to a large extent. To this end there is provided a control cluster for a nuclear reactor, comprising a spider from which are suspended rods containing a neutron-absorbing material. In at least some of the rods, the material consists of stainless steel in a lower part of the rod. In an upper part of the rod, over a proportion of between 20 and 40% of the height of absorbing material, it consists of at least one highly absorbing material such as a ternary silver, indium and cadmium alloy, possibly containing traces of other elements as unavoidable impurities.

In an alternative embodiments the upper part does not consist only of a column of Ag-In-Cd alloy pellets. In a top section of this part, the alloy is replaced by a column of boron carbide $B_4C$ pellets, in adjustable proportions; heights of approximately 1 m of Ag-In-Cd and 30 cm of $B_4C$ give good results.

This last constitution offers a particular advantage in the current 1300-MWe PWR reactors. In some of these reactors, in fact, some of the "black" clusters already contain a stack which has two superposed Ag-In-Cd and $B_4C$ columns. The mass of the conventional grey clusters is then greater than the mass of the black clusters, although the stainless steel pellets are hollow.

The composite constitution makes it possible to reduce the increase in the mass of the grey clusters caused by their composite nature. It allows the boron carbide $B_4C$ to be subjected to a received flux level comparable to that of some of the black clusters (N1 group in the case which will be described later).

There is also provided a nuclear reactor of the kind defined above, comprising clusters movable between the core and the upper internals of the reactor by drive means, said clusters comprising black clusters and grey clusters having a negative reactivity lower than that of the black clusters, for power regulation, wherein at least some of the grey clusters have the constitution defined above.

When, as is often the case, the grey clusters are divided into two groups, one of which is inserted after the other to bring the reactor to a low power or to shut it down, the clusters belonging to the group inserted second into the core have the constitution defined above.

In most current pressurized water reactors, bringing the reactor to a state where its power is zero or very low causes a distortion of the axial distribution of the neutron flux and the appearance of a marked maximum towards the top of the core. Consequently, the increase in efficiency of the grey clusters in accordance with the invention is much greater than the increase in negative reactivity that could be expected as a result merely of the substitution of one material for another in the top part of the rods.

Given that the highest third of the absorbing part of a rod or of a cluster of the group inserted second enters the core only from the time when the power is reduced to a value of about half of the nominal power, the power regulation and load-following clusters will retain their "grey" cluster character substantially throughout the period of the normal utilization of the reactor, with the result that the application of the invention hardly affects neutron economy during the most frequent phases of operation.

BRIEF DESCRIPTION OF THE DRAWINGS

The invention will be understood better from the description which follows, of a particular embodiment of the invention, given by way of example. The description refers to the accompanying drawings.

DETAILED DESCRIPTION

A description will now be given of a possible embodiment of the invention, applied to a reactor whose core consists of assemblies of square cross-section, having the distribution given in FIG. 1. However, the invention is also applicable to different reactors with a hexagonal lattice and/or possibly comprising clusters for varying the neutron energy spectrum, in addition to the clusters which only cause neutron parasitic absorption.

Figure 1:
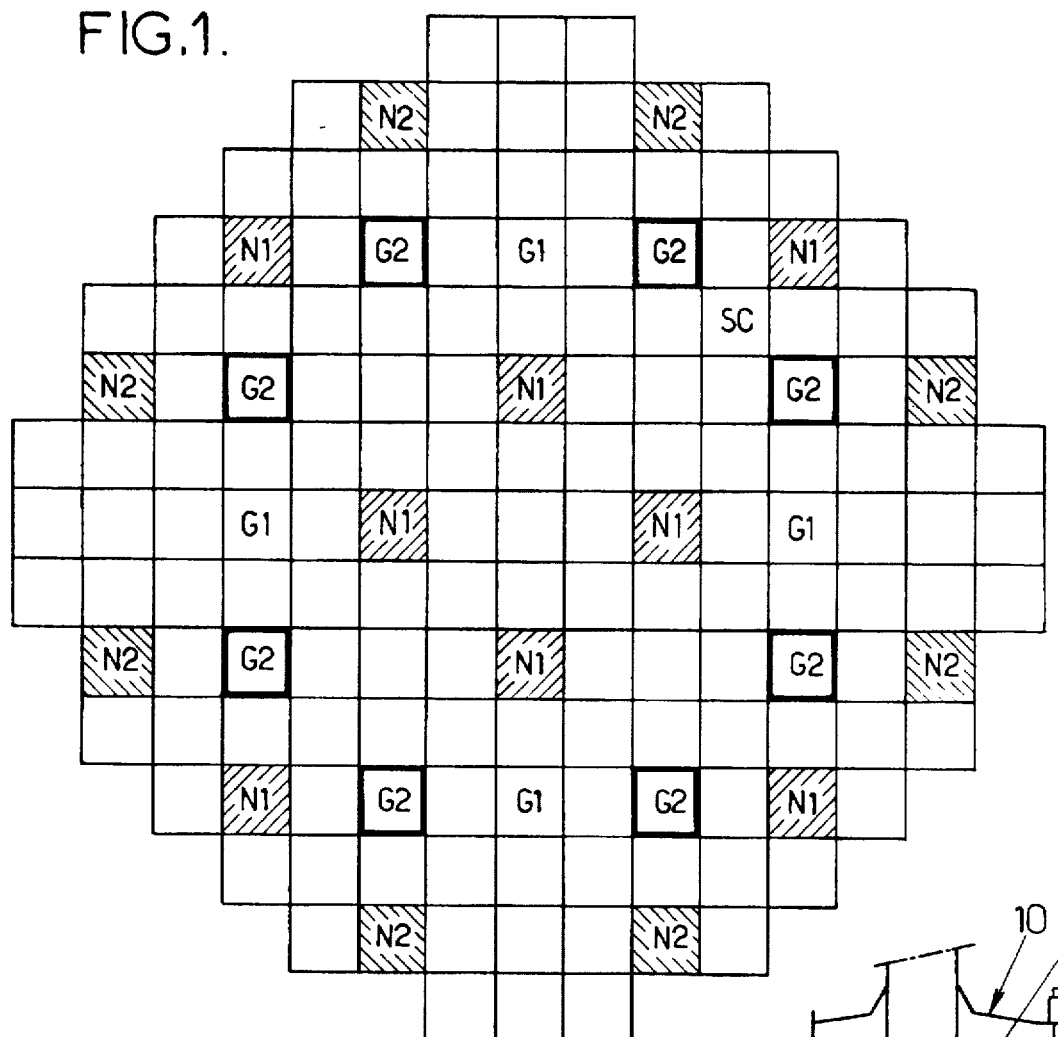
FIG. 1 is a diagram showing a possible distribution of black and grey clusters in the core of a pressurized-water nuclear reactor often employed at the present time to form units of 900 MWe.

In FIG. 1, the only clusters whose location has been shown are those which the driving mechanisms allow to be inserted into the core or withdrawn from the core. The locations denoted by N1 and N2 receive "black" clusters. The rods of these clusters contain, over their entire height, the same neutron-absorbing material, such as, for example, a ternary alloy containing 80% of silver, 15% of indium and 5% of cadmium by weight. The eight clusters at locations N1 are used for power compensation, whereas the eight clusters at locations N2, at the periphery of the core, are employed essentially for shutting the reactor down. The sixteen clusters may contain a material with high neutron absorption, which may be one of the Ag-In-Cd alloys or another element in a dispersed state, for example hafnium.

The locations in the core which are denoted by G1 and G2 receive "grey" clusters, each of which has a negative reactivity which is markedly lower than that of the "black" clusters for the same depth of insertion into the core. The four G1 clusters are designed to be inserted into the core before the eight G2 clusters, which are also intended for power regulation. In general, the upper third of the column of absorbing material in the rods of the G2 clusters is placed in the core only when the power is lower than approximately 55% of the nominal power, i.e., in relatively infrequent operating conditions and especially after the N1 group has begun to enter the core.

Figure 2:
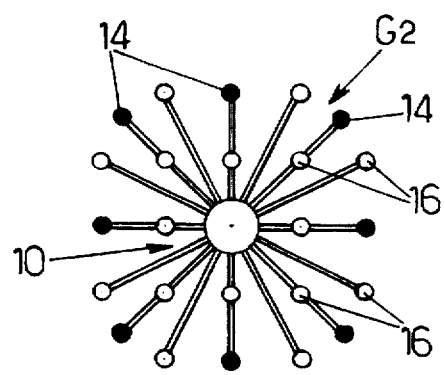
FIG. 2 shows schematically the spider of a cluster and the rods which it supports, in plan view.
Figure 3:
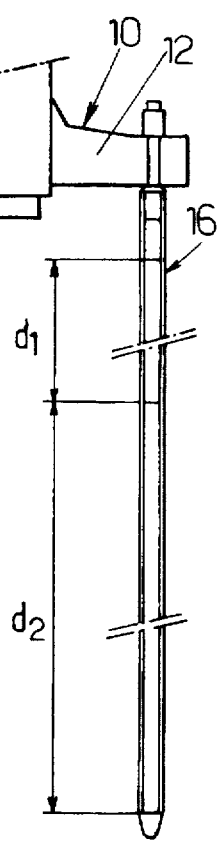
FIG. 3 shows a possible distribution of the absorbers in a "grey" cluster.

The "grey" clusters often have the construction shown in FIGS. 2 and 3. They comprise a spider 10 whose hub is designed to be secured to a drive shaft and each of whose radial arms 12 carries one or two rods. The G2 cluster shown by way of example in FIG. 2 comprises twenty-four rods. In the "grey" clusters, often employed at the present time, eight rods 14 (shown as black circles in FIG. 2) contain an absorbing alloy, which may be the same one as that in the "black" clusters. The sixteen other rods 16, shown as white circles, contain a much less absorbing material, for example stainless steel.

In accordance with the invention, an upper fraction $d_1/(d_1+d_2)$ of the column of absorbing material of the rods 16 consists of a material with high neutron absorption, which may be the same one as that contained in the rods 14. The length $d_1$ will be generally between 20 and 40% of the total height of the absorbing column. In the 900 and 1300-MWe pressurized water reactors which are most common, a $d_1/d_2$ ratio of the order of ½ generally will give good results. Up to this value, in fact, the saving in the shutdown margin neutron balance of the reactor increases approximately linearly with $d_1$. Beyond this, the saving increases appreciably less rapidly than the addition of highly absorbing material, which is probably due to the fact that the favorable effect of the shift of the maximum of the distribution flux towards the top of the reactor at low power is less marked in its effects.

It can be seen, therefore, that the safety balance can be appreciably improved at the cost of small modifications, since only the nature of a part of the material contained in the sheath is modified, and this is done without appreciably affecting the neutron economy during normal operation of the reactor.

I claim:

1. A control cluster for a nuclear reactor, for power regulation and load following, comprising a spider, a plurality of rods suspended from said spider and each containing neutron-absorbing material, wherein the neutron-absorbing material contained in only some of said rods of said cluster consists of:

(a) stainless steel in a lower port of the rod; and (b) a column of material exhibiting a neutron absorption capacity substantially higher than that of stainless steel, at least part of said material being a ternary silver-indium-cadmium alloy with unavoidable impurities, in an upper part of each of said some of said rods, along a portion of between 20 and 40% of a height of said neutron-absorbing material; and wherein, in all other rods of said cluster, the neutron-absorbing material is a column of pellets of said ternary silver-indium-cadmium alloy.

2. The control cluster according to claim 1, wherein said portion is approximately one-third of the height of said neutron-absorbing material.

3. The control cluster according to claim 1, having twenty-four rods, wherein said some of said rods are sixteen in number and said other rods are eight in number and are regularly distributed in said cluster.

4. A pressurized-water nuclear reactor comprising:

(a) a plurality of black control clusters each comprising a spider from which are suspended control rods each containing a column of neutron-absorbing material selected from the group consisting of a ternary silver-indium-cadmium alloy and boron carbide; and (b) a plurality of grey control clusters, which have a neutron absorption lower than that of said black clusters, comprising a spider from which are suspended control rods each containing neutron-absorbing material, wherein said grey control clusters consist of:

(i) first grey clusters for insertion first into a core of the reactor, whose control rods each contain a same neutron-absorbing material over a whole length thereof; and (ii) second grey clusters for insertion last into the core for reduction of the power of the reactor, wherein some of said rods of each of the second grey clusters contain neutron-absorbing material which is stainless steel in a lower part of the rod and, in an upper part of the rod having a length equal to 20 and 40% of a height of the column of absorbing material, the same neutron-absorbing material as in the control rods of the black control clusters, while the neutron-absorbing material in all other rods of said grey control clusters is the same as in the black control clusters.

5. Cluster according to claim 1, wherein the ternary alloy is replaced with boron carbide in a top section of the said upper part.

6. Cluster according to claim 5, wherein said top portion has a length of approximately 30/130 of the upper part.

* * * * *

UNITED STATES PATENT AND TRADEMARK OFFICE
CERTIFICATE OF CORRECTION

PATENT NO. : 5,754,608
DATED : May 19, 1998
INVENTOR(S): Luc PILLET

It is certified that error appears in the above-identified patent and that said Letters Patent is hereby corrected as shown below:

On the title page: Item

[73] Insert the name and address of the second assignee
--Framatome, Courbevoie, France--.

Signed and Sealed this

Tenth Day of November 1998

*Attest:*

BRUCE LEHMAN

*Attesting Officer*  *Commissioner of Patents and Trademarks*